United States Patent [19]
Egelske

[11] Patent Number: 5,518,283
[45] Date of Patent: May 21, 1996

[54] PROTECTIVE GUARD ASSEMBLY FOR VEHICLES

[76] Inventor: Brett A. Egelske, 6336 N. Keystone Ave., Indianapolis, Ind. 46220

[21] Appl. No.: 294,390

[22] Filed: Aug. 23, 1994

[51] Int. Cl.⁶ .................................................. B60R 19/42
[52] U.S. Cl. .............................. 293/128; 293/4; 293/21; 293/118
[58] Field of Search ................................ 293/4, 21, 118, 293/128

[56] References Cited

U.S. PATENT DOCUMENTS

| | | |
|---|---|---|
| 1,641,225 | 9/1927 | Johnson ................................ 293/128 |
| 2,512,527 | 6/1950 | Hoffman . |
| 2,990,212 | 6/1961 | Nicastro ............................ 293/118 X |
| 3,718,357 | 2/1973 | Hertzell . |
| 4,221,410 | 9/1980 | Dawson . |
| 4,221,412 | 9/1980 | Miller . |
| 4,437,697 | 3/1984 | Hinojos . |
| 4,461,503 | 7/1984 | Melby . |
| 4,493,502 | 1/1985 | Campbell, Jr. . |
| 4,530,519 | 7/1985 | Marshall . |
| 4,580,136 | 4/1986 | Kitamura et al. . |
| 4,848,823 | 7/1989 | Flohr et al. . |
| 4,897,643 | 1/1990 | Shibata et al. . |
| 4,904,016 | 2/1990 | Tatsumi et al. ..................... 293/117 X |
| 4,988,258 | 1/1991 | Lutz et al. .......................... 293/118 X |
| 5,004,281 | 4/1991 | Yamazaki . |
| 5,129,677 | 7/1992 | Marshall . |
| 5,140,316 | 8/1992 | DeLand et al. . |
| 5,193,869 | 3/1993 | Land ..................................... 293/128 |

Primary Examiner—Dennis H. Pedder

[57] ABSTRACT

A protective assembly and method for use in combination with a vehicle body to protect the side and door panels of the vehicle body comprises an elongated guard movable between a retracted position in which it underlies the vehicle body and an extended position in which it overlies the side of said vehicle body, a bi-directional electric motor for rotatingly driving the guard between its retracted and extended positions, a pair of linkage assemblies pivotally securing the guard within the wheel wells of the vehicle body wherein one of the linkage assemblies is secured to a drive shaft of the motor to define an intermediary through which the motion of the drive shaft is transferred to the guard, an electrical energy source, and wireless control units allowing for the remote activation of the protective assembly.

15 Claims, 11 Drawing Sheets

PROTECTIVE GUARD ASSEMBLY FOR VEHICLES

FIELD OF THE INVENTION

This invention relates to protective assemblies for vehicles and, more particularly, to a protective guard assembly for protecting the door and side panels of the body of a vehicle.

BACKGROUND OF THE INVENTION

Various attempts have been made to protect the door and side panels of a vehicle from being dented, dinged or nicked when persons carelessly open the doors of adjacent vehicles and allow the edges thereof to strike the door or side panel(s) of the subject vehicle.

One such attempt includes new car manufacturers and/or automobile dealers attaching protective molding along the side and door panels of vehicles to prevent such nicks or small dents. While these side molding strips, which are commonly formed of rubber-like or plastic material, offer some degree of protection, they normally are quite narrow and extend only about one-half inch outwardly from the surface of the side or door panel. Consequently, doors of adjacent vehicles nonetheless commonly damage the finish and paint of many vehicles equipped with such side molding strips.

Numerous other prior art attempts include retractable sideguard protectors or bumpers. For example, Hoffman, U.S. Pat. No. 2,512,527, relates to an extendible/retractable guard for protecting the sides of a vehicle that is actuated by power means accessible from the driver's seat. Hoffman's protector includes an elongated bumper rotatable from a first retracted position beneath the chassis of the vehicle to a second extended position in which it overlies only the lower portion of the side of the vehicle. The bumper of Hoffman is driven between its retracted and extended positions by power means including a pair of hydraulic cylinders arranged beneath the car. Hoffman fails to provide any protection to the area of the side and door panels that need it most, the mid-sections of the door, that, on modern vehicles, tend to extend outwardly the farthest, thereby making them more vulnerable to dings and dents. Moreover, most of today's vehicle body designs would not accommodate an assembly such as Hoffman's.

Hertzel, U.S. Pat. No. 3,718,357, discloses a retractable side bumper guard attached to the underside of the automobile. Hertzel's system includes a flat baseboard, which is driven by pneumatic cylinder-and-piston assemblies attached to the baseboard, and a similarly shaped sub-baseboard that is normally biased in a vertical position by means of spring hinges when the assembly is fully extended outwardly from beneath the vehicle. The baseboard and sub-baseboard assembly is moved to its extended protective position by an actuating piston, thereby permitting the sub-baseboard to move to its biased vertical position once it clears the side frame of the vehicle. To remove the bumper guard from its operative position, the drive element is actuated in a reverse manner to retract the baseboard and sub-baseboard such that they lie completely beneath the automobile. As with Hoffman, Hertzel fails to protect the vulnerable mid-section portions of the sides of the vehicle, and today's vehicle body designs will not accommodate such a structure.

Hinojos, U.S. Pat. No. 4,437,697, also discloses a retractable side guard for an automobile to prevent the door and side panels from being damaged when persons carelessly open the doors of adjacent automobiles. Hinojos discloses a side guard mechanism carried within two tubular housing elements attached to the bottom of the automobile. In a fully extended configuration, telescoping mechanisms extend from the tubular housings, both of which include an upright member connected to a pivot mechanism, which in turn are connected to piston-pivot blocks that slide back and forth within the tubular housings. T-bars are connected to the outer ends of the tubular members and have pairs of telescoping rods extending from their opposed ends. The free ends of the telescoping rods each extend into an elongated sleeve to collectively form a single rigid rod extending horizontally along the side of the car. The protective rod assembly of Hinojos is extended outwardly in a protective position and retracted inwardly into its inoperative position manually by the user.

Other attempts exemplary of the conventional art include U.S. Pat. Nos. 4,221,410; 4,221,412; 4,461,503; 4,493,502; 4,530,519; 5,004,281; and 5,129,677.

A need still exists, however, for a protective assembly that has few parts, is simple in operation, and that may be readily retrofitted to existing vehicles of varying makes and models, or installed in new vehicles during their manufacture, to protect the side and door panels of the subject vehicle from the doors of adjacent vehicles.

SUMMARY OF THE INVENTION

The apparatus of this invention comprises a method and an assembly for protecting the sides of vehicles from "dings and dents" caused primarily from doors of adjacent vehicles. The protective assembly includes an elongated guard that is pivotable between a first retracted position beneath the side of the vehicle and a second protective extended position adjacent to but spaced outwardly from the side of the vehicle to engage opening doors of adjacent vehicles and prevent the edges of such doors from damaging the side and door panels of the subject vehicle.

The protective assembly further includes an electric reversible motor and wireless communication means to activate the assembly to move the guard between its retracted and extended positions. The wireless communication means includes a portable signal transmitter carried by the operator of the vehicle and a signal receiving unit carried by the vehicle and coupled to the electric motor.

The motor is preferably secured within one of the wheel wells (front or rear) of the vehicle and moves the guard via a first linkage assembly connected to the drive shaft of the motor. A free-moving ("dummy") second linkage assembly is connected to the opposing end of the guard and is pivotally secured within the opposing wheel well of the vehicle.

The invention also provides a kit assembly that can be readily retrofitted to an existing vehicle of most makes or models, or installed in a newly manufactured vehicle. The kit assembly may be fitted to a vehicle by securing the drive motor to the central-most wall of one of the two wheel wells and connecting the motor via hard wiring both to a battery and to the signal receiving unit of the assembly. The battery of the vehicle can serve as the electrical power source for the assembly, or the system may include its own separate power source. One end of the guard having the first linkage assembly secured thereto can be connected to the drive shaft of the motor, and the opposing end of the guard having the second linkage assembly secured thereto can be pivotally secured to the central-most wall of the opposing wheel well.

To protect door edges and other articles from the abrading surfaces presented by the protective assembly, the guard and its related linkage assemblies may be encased in a plastic, foam or elastomeric covering.

The invention also provides a method of protecting the side and door panels of a vehicle. Such a method generally includes the steps of providing an elongated guard with a separate linkage assembly attached to each of its opposing ends; providing a reversible electric motor having a drive shaft; providing an electrical energy source to power the electric motor; providing a signal receiving unit carried by the vehicle and electrically coupling the signal receiving unit to the motor; providing a portable wireless signal transmitting unit adapted to be carried by an operator; securing the motor to a central-most wall of either the front or rear wheel well on one side of the vehicle; fixedly securing one end of the guard via the corresponding linkage assembly to the drive shaft of the motor and securing the opposing end of the guard via the other linkage assembly to the central-most wall of the opposing wheel well so that end of the guard pivots freely; and moving the guard between its inoperative retracted position beneath the vehicle and its operative extended position adjacent to but spaced outwardly from the side of the vehicle.

Other features and advantages of the invention will be apparent from the drawings and detailed description that follows.

BEST MODE FOR CARRYING OUT THE INVENTION

Figure 1:
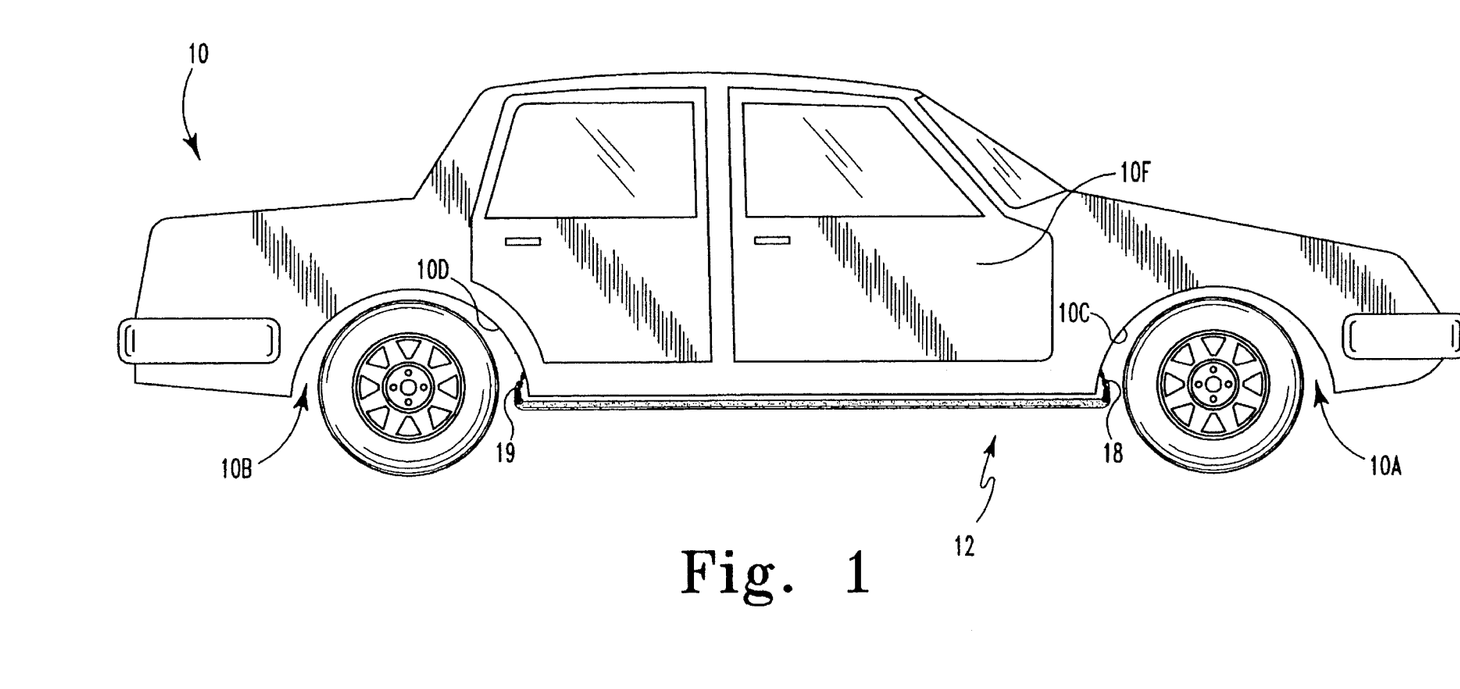
FIGS. 1 and 2 are side plan views of a vehicle equipped with the invention illustrating the protective assembly in the retracted ready position and the extended protective position, respectively.
Figure 2:
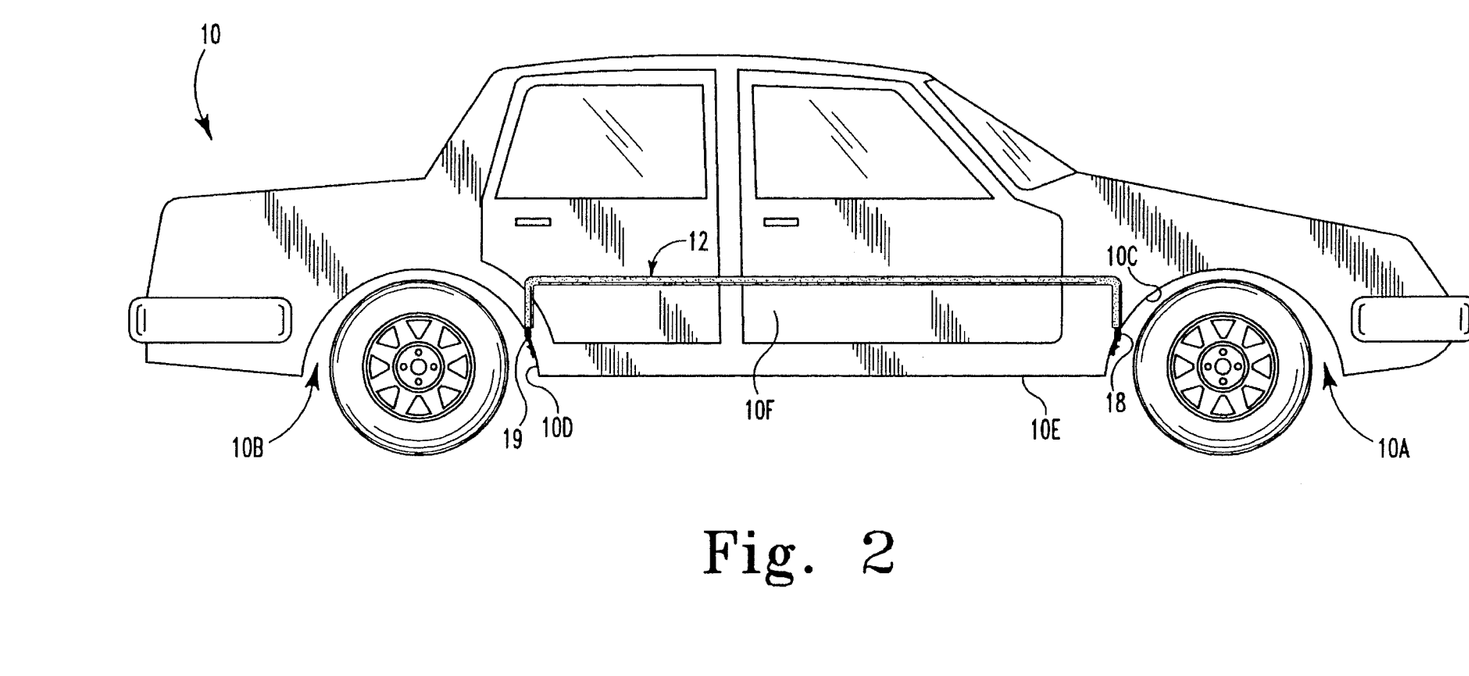
Figure 3:
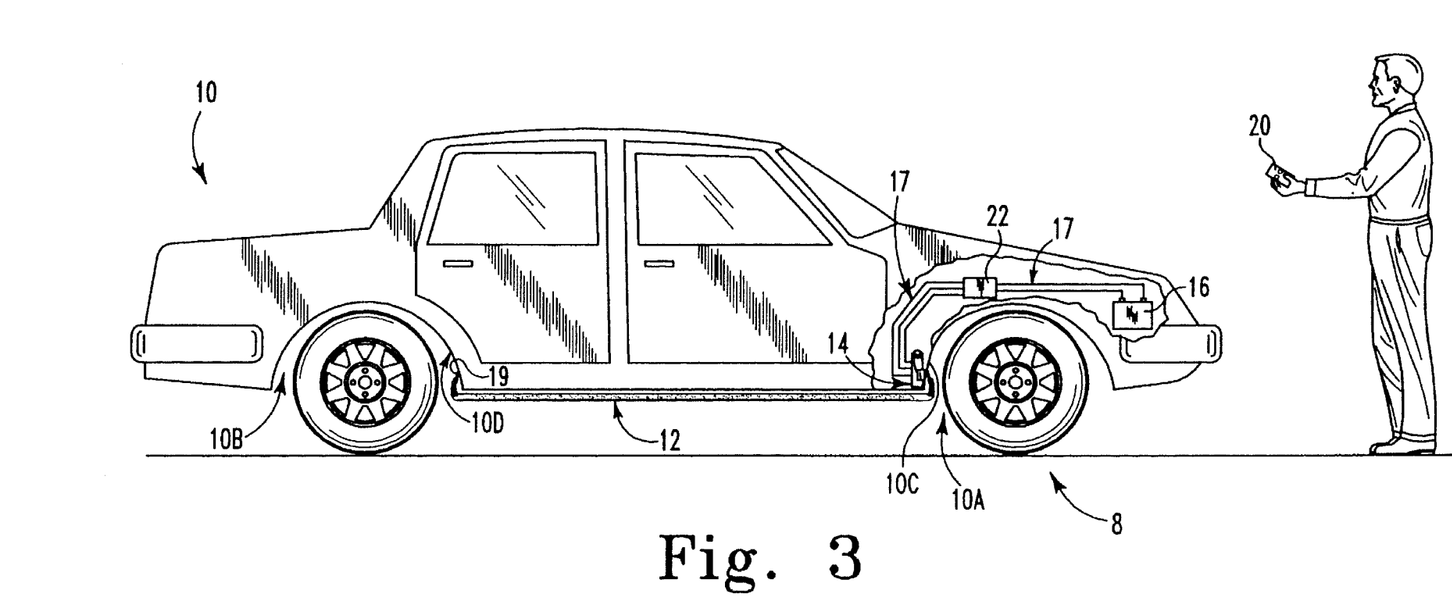
FIG. 3 is a partially cut-away side view of the vehicle of FIG. 1 illustrating the relative arrangement of the elements of the invention disposed within the body of the vehicle.
Figure 6:
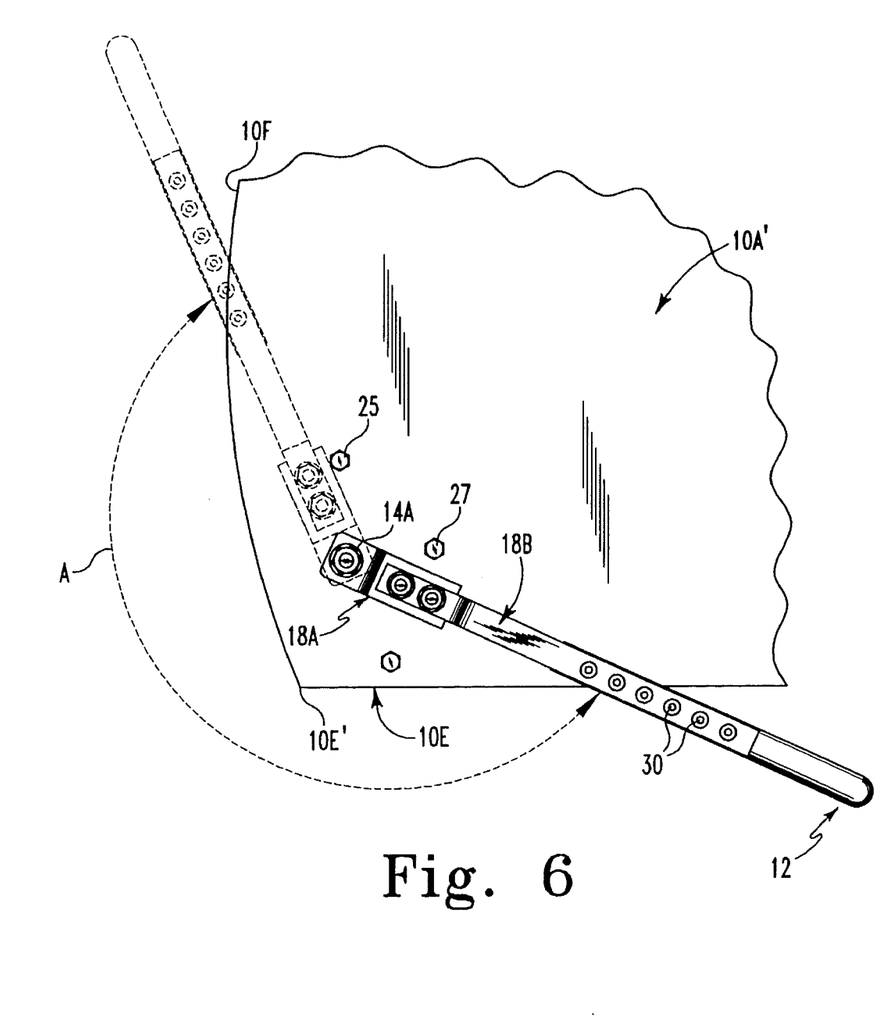
FIG. 6 is an enlarged isolated plan view of the path of movement of the driving linkage arm assembly and the guard of the invention.

Referring now to the drawings, particularly FIGS. 1–3, wherein like reference numerals designate identical or corresponding parts and elements throughout the several views, the invention provides a protective assembly 8 for a vehicle 10 including an elongated, semi-rigid guard or bumper bar 12 that is pivotable between a first retracted ready position beneath the side edge of the bottom frame of vehicle 10 (FIGS. 1, 3 and 6), and a second extended protective position adjacent to but spaced outwardly from the side of vehicle 10 (FIGS. 2 and shown in phantom lines in FIG. 6).

The invention further comprises attachment means for pivotally securing guard 12 to the subject vehicle 10 defined by first and second linkage assemblies 18 and 19, respectively (FIG. 4), driving means defined by an electric motor 14 (FIGS. 3 and 7) for rotating guard 12 between its retracted ready position and its extended protective position, and control means for activating the protective assembly 10 defined by a signal receiving unit 22 coupled to motor 14 and a wireless portable signal transmitting unit 20, which is adapted to be carried and activated by an operator (FIG. 3).

Motor 14, equipped with a drive shaft 14A, is preferably defined by a 12-volt, direct-current, reversible or bi-directional motor secured to central-most wall 10C of the front wheel well 10A of vehicle 10. As shown best in FIGS. 4, 5 and 7, motor 14 moves the bumper guard 12 via first driving linkage assembly 18, which is connected at one end to the drive shaft 14A and at its opposite end to one end of guard 12. First driving linkage assembly 18 includes a sub-arm 18A connected to drive shaft 14A and a larger linkage arm 18B connected to bumper guard 12.

The opposing second linkage assembly 19 preferably includes a single arm (FIG. 4) connecting the opposite end of guard 12 to the central-most wall 10D of the opposing wheel well 10B where it is pivotally secured at 19A (FIG. 4) to be freely-rotating, thereby defining a "dummy" linkage assembly 19.

Motor 14 is preferably mounted to the central-most wall 10C of the front wheel well 10A because of the close proximity to the vehicle battery 16 or a fuse box of the vehicle and the availability of space under the hood or the dashboard of the vehicle in which to locate signal receiving unit 22. Such an arrangement is not essential, however, as alternative locations of the components of the assembly can prove suitable for the effective operation of this invention. As used in this disclosure, "central-most" refers to that wall of either the front or rear wheel well that is closest to the longitudinal center of the vehicle, which would include forward wall 10D of the rear wheel well 10B and the rear wall 10C of the forward wheel well 10A. The invention can still operate effectively, however, with motor 14 mounted to the forward wall 10D of rear wheel well 10B and the "dummy" end of guard 12 pivotally secured to the rear wall 10C of front wheel well 10A.

Figure 4:
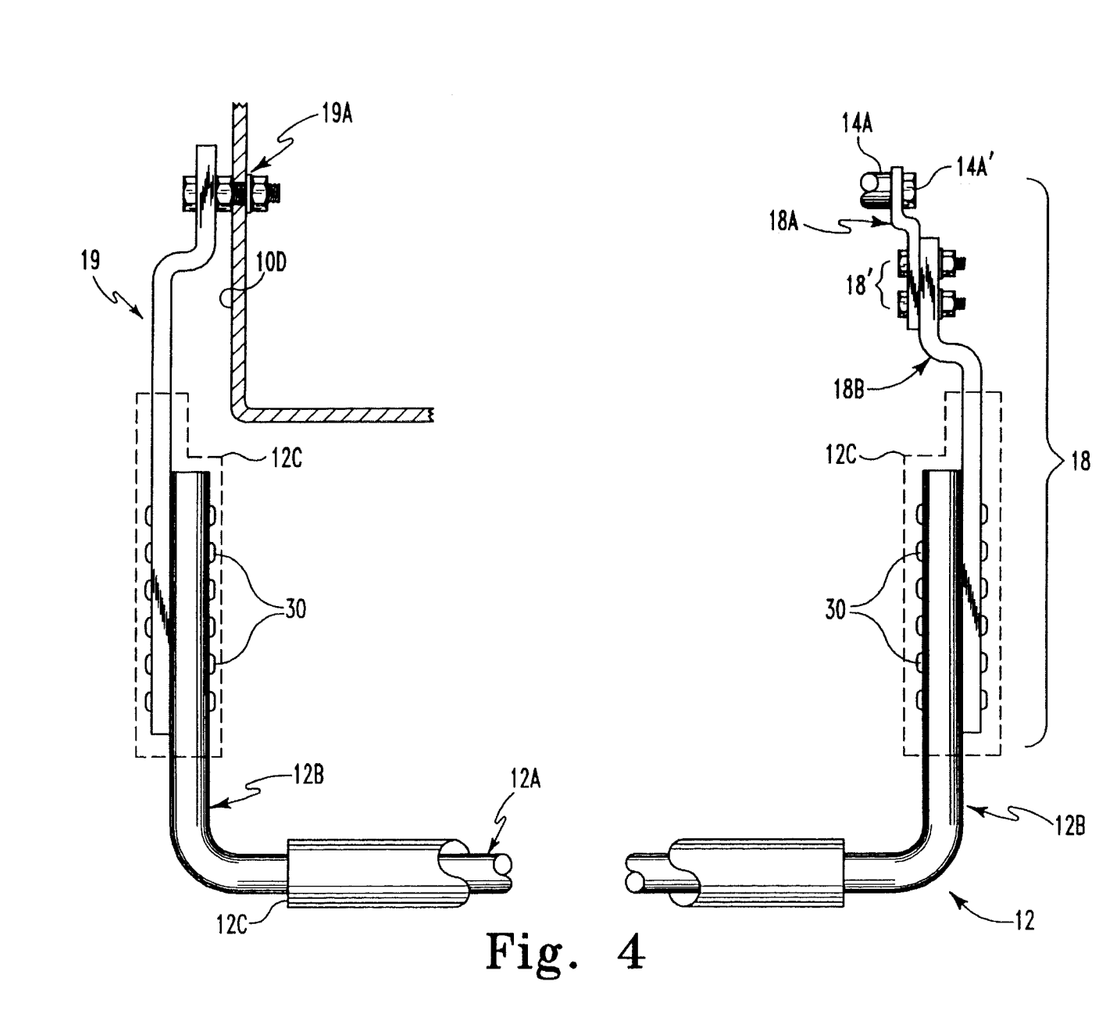
FIG. 4 is a partial plan view of the guard and linkage arm assemblies of the invention.
Figure 5:
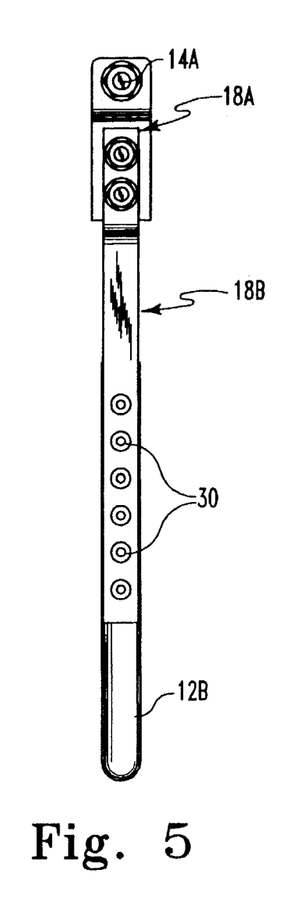
FIG. 5 is an end plan view taken from the right of FIG. 4.

In one preferred embodiment as shown in FIG. 4, guard 12 can include a long straight portion 12A terminating at each end in a curved portion 12B, which is shorter in length relative to straight portion 12A. Guard 12 is preferably constructed of a generally strong material such as aluminum, steel, an alloy, a composite material, or the like. Guard 12 should be of sufficient strength to resist, while in the extended protective position, deflecting inwardly and contacting the side or door panels of the subject vehicle when engaged by the edge of a car door of an adjacent vehicle.

As shown in FIG. 3, signal transmitting unit 20 comprises a wireless portable remote transmitter for generating a predetermined activation signal detectable by signal receiving unit 22, which is provided with the proper circuitry as discussed below for receiving the activation signal and activating the motor 14. Signal units 20 and 22 preferably utilize a radio frequency signal containing digitally encoded control signals having a frequency in the hundreds of Megahertz. In a preferred embodiment remote units 20 and 22 operate at a frequency of about 315 Megahertz, which is generally clear of the more common sources of interference such as cellular phones and the like. Digital encoding allows for thousands of different code settings for the control unit 22. While the activation signals are digital in the preferred embodiment, the signals can be analog if desired.

The control receiving unit 22 also functions as a transformer to step down the voltage of the power source (vehicle battery 16) to a sufficient level suitable for motor 14. Motor 14, battery 16 and signal receiving unit 22 can be interconnected via hard wiring 17 (FIG. 3), which can be provided by conventional 18 AWG wire. As shown in FIG. 3, the hard wiring 17 interconnecting motor 14 with signal receiver 22 preferably includes three wires: a first wire for carrying the activation or "extend" signal to motor 14 to move the guard 12 from its retracted ready position to its extended protective position; a second wire for carrying the activation "retract" signal to motor 14 to move guard 12 from its extended position back to its retracted position; and a third ground wire. A remote control receiver suitable for the invention is a 2-channel unit available from Linear Moore-O-Matic as Model No. ASAP Rx 2. A remote control transmitter suitable for the invention is a 2-channel unit also available from Linear Moore-O-Matic as Model No. ASAP Tx 2. Similar remote controlled systems are disclosed in DeLand et al., U.S. Pat. No. 5,140,316 to operate a sliding power-operated door of a van, and in Flohr et al., U.S. Pat. No. 4,848,823, to control a power assisted vehicle cover, both of which disclosures are incorporated herein by reference.

Figure 7:
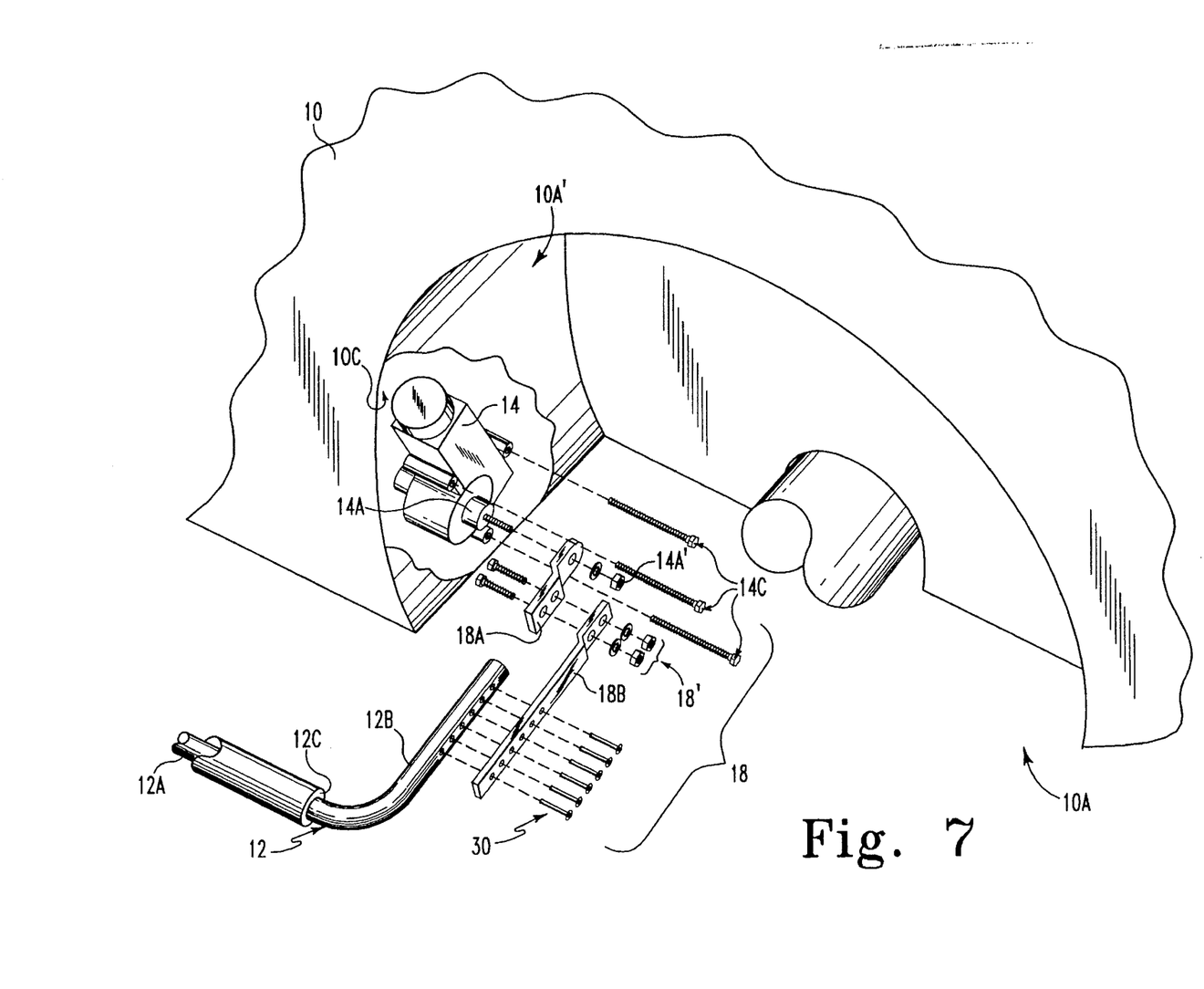
FIG. 7 is an isolated perspective view illustrating, in an exploded fashion, the manner in which the drive motor, the driving linkage arm assembly and the guard are assembled to one another and secured within a wheel well of the subject vehicle.

As shown in more detail in FIG. 7, motor 14 is preferably secured by conventional means including mounting bolts or screws 14C to rear wall 10C behind the liner 10A' if one is present, located within the front wheel well 10A of vehicle 10. Wheel well liner 10A' can be removed or a portion cut-out to gain access to wall 10C.

Linkage sub-arm 18A of the driving linkage arm assembly 18 (FIGS. 4, 5 and 7) is secured at one end directly onto drive shaft 14A, which is preferably threaded, of motor 14 by a conventional fastening means, such as washer and nut combination 14A'. Larger linkage arm 18B is in turn affixed to sub-arm 18A via conventional fasteners such as a pair of nut-washer-bolt sets 18'. A pair of fasteners 18' is preferably employed at the junction between sub-arm 18A and larger linkage arm 18B to maintain linear rigidity along the entire length of driving linkage assembly 18. In the embodiment shown in the drawings, a combination of linkage arms 18A and 18B are employed to define driving linking assembly 18 for manufacturing efficiency in that larger linkage arm 18B can be of similar or identical dimensions as dummy linkage arm 19, thereby reducing the number of separate components comprising the invention and, accordingly, reducing its cost of manufacture. Thus, while sub-arm 18A is shown employed with the invention, larger linkage arm 18B can be specifically dimensioned to fully extend and be secured directly onto drive shaft 14A of motor 14 and same is contemplated as part of this invention. Linkage arms 18B and 19 are each connected and secured to the curved extensions 12B of guard 12 by a plurality of conventional fasteners such as rivets 30 to, again, preserve the linear rigidity of the connections at that junction of the linkage assemblies.

Figure 8:
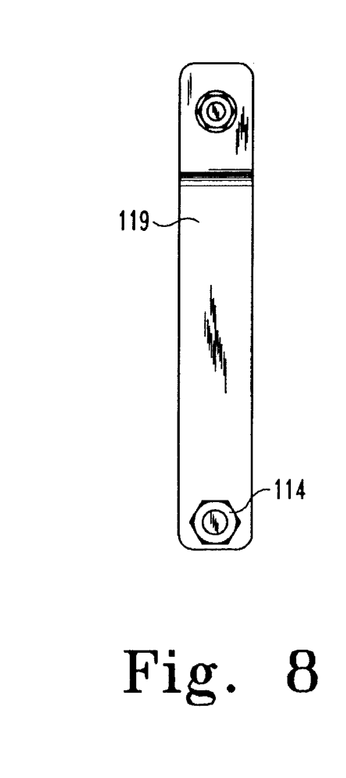
FIGS. 8, 9 and 10 are side and end plan views, respectively, of an alternative guard and linkage assemblies provided by the invention.
Figures 9, 10:
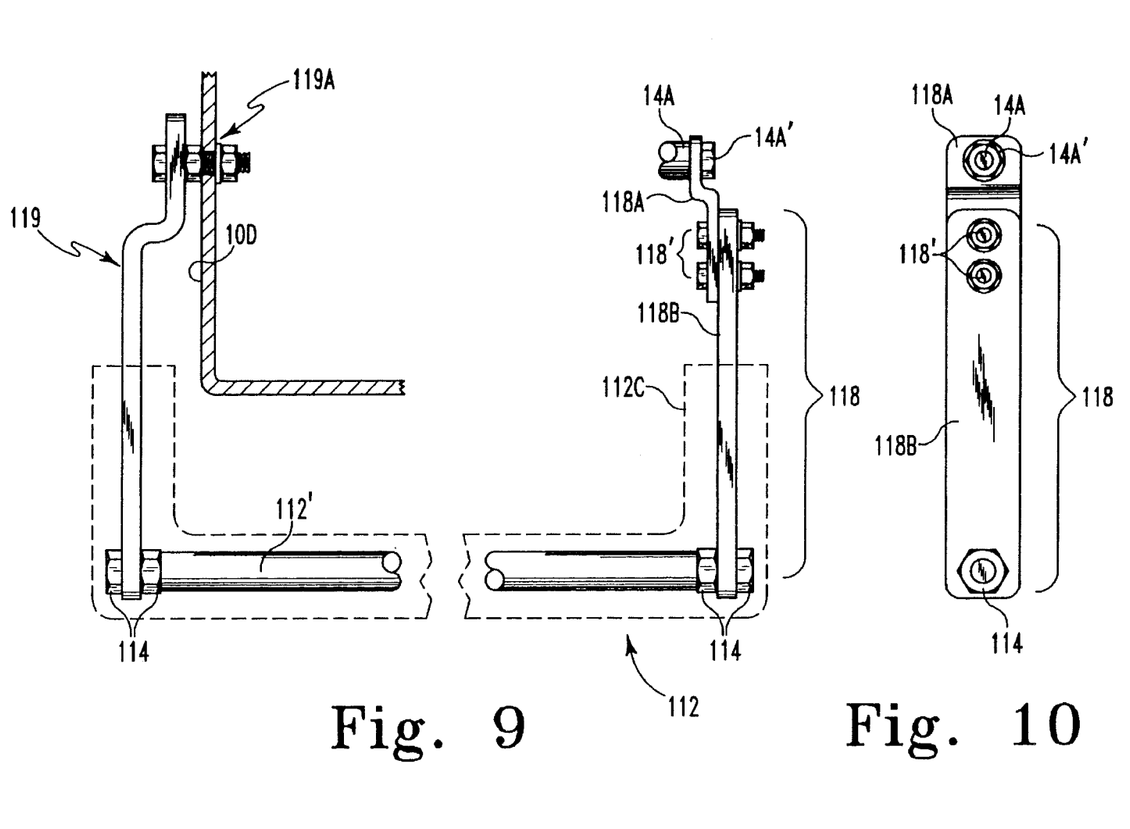

An alternative embodiment of a bumper guard 112 and linkage assemblies 118, 119 interconnecting the guard 112 to the subject vehicle is shown in FIGS. 8–10. Driving linkage assembly 118 interconnects the guard 112 with the motor drive shaft 14A and includes a linkage sub-arm 118A secured at one end directly to onto threaded drive shaft 14A by conventional fastening means such as nut 14A. A longer linkage arm 118B is in turn affixed to sub-arm 118A via conventional fasteners such as a pair of nut-washerbolt sets 118'. As shown in FIGS. 8–10, bumper guard 112 comprises a straight rod member 112' received and secured at each end in an opening provided in larger linkage arm 118B and dummy linkage arm 119. Each end of guard 112' is preferably threaded so as to receive conventional fasteners such as locknut washers 114 at each end as shown in FIGS. 8–10. As with the previous embodiment, a combination of linkage arms 118A and 118B are employed to define driving linkage assembly 118 for manufacturing efficiency. Accordingly, larger linkage arm 118B can be specifically dimensioned to fully extend and be secured directly onto drive shaft 14A of motor 14.

To protect door edges and other articles from the abrading surfaces presented by the protective assembly of this invention the bumper guard 12, 112 and its related curved extensions 112B (FIG. 4) and linkage assemblies 18, 19 and 118, 119 may be wholly or partially encased in a protective plastic or elastomeric material or covering 12C, 112C (partially shown in phantom lines in FIGS. 4 and 8), which can include rubber tubing, foam padding or the like.

An important advantage of the guard embodiment shown in FIGS. 8–10 is that the rod-like member 112' may be manufactured in a variety of lengths to accommodate a variety of makes and models of vehicles. This is particularly advantageous when the bumper guard assembly is refitted to an existing vehicle as the installers are able to inventory a plurality of kit assemblies having rods of varying lengths and simply install the appropriate sized kit assembly as needed.

In operation, upon receiving an activation or pulse signal from signal transmitting unit 20, which is activated by the operator (FIG. 3), signal receiving unit 22 activates reversible motor 14, which in turn rotating drives the drive shaft 14A in a first rotational direction (clockwise in FIG. 6) to move driving linkage assembly 18, 118 and, correspondingly, guard 12, 112 in a pivoting rotating fashion along an arcuate path "A" from its retracted position (shown in solid lines in FIG. 6) beneath the bottom frame 10E of vehicle 10 adjacent the side edge 10E thereof (see FIG. 1) to an extended protective position (shown in phantom lines in FIG. 6) overlying the side and door panels 10F of the vehicle and spaced outwardly from the vehicle a preferable distance of approximately 4–6 inches. The dummy end of the guard 12, 112 pivots freely about point 19A, 119A at central-most wall 10D of the rear wheel well 10B.

Upon receiving a subsequent activation signal from signal receiving unit 22, motor 14 rotatingly drives the drive shaft 14A in the opposite direction, which in turn moves guard 12, 112 in the opposite direction (counter-clockwise in FIG. 6) ultimately to its fully retracted position shown in solid lines in FIG. 6.

In its extended protective position as shown in FIG. 2, guard 12 is preferably disposed at a vertical position about even with the top of the wheel wells 10A and 10B of the vehicle to correspond with the mid-section of the side and door panels that, as discussed above, extend the furthest outwardly. A stopper element 25 (FIG. 6) is selectively disposed on wheel liner 10A' and/or wheel well wall 10C to stop the clockwise movement of guard 12 at the desired predetermined height as it moves into its extended protective position. Stopper element 25 can be defined by a bolt head or the like. Likewise, a second stopper element 27 can be provided to prevent the guard 12 from swinging past a predetermined point during its counter-clockwise movement back to its retracted position. Motor 14 is also equipped with internal limit switches 14B, 14C (FIG. 14) to stop the rotational movement of the armature 15 and, hence, of drive shaft 14A at the predetermined position so that guard 12 is satisfactorily positioned in its extended protective position or its retracted position. Motors similar to electric motor 14 provided by this invention are commonly used to operate "flip-up" headlights on modern automobiles. Stopper elements 25 and 27 further assure the accurate positioning and movement of the guard assembly.

The invention further provides a protective assembly kit that can be readily retrofitted to an existing vehicle, or installed in a newly manufactured vehicle, by securing the drive motor 14 to the central-most wall of one of the two wheel wells (see FIGS. 3 and 7) and connecting the motor via hard wiring to the battery 16 or to a fuse box of the vehicle and to signal receiving unit 22. One end of the guard 12 having linkage arms 18A and 18B can be connected to the drive shaft 14A of motor 14 and the opposing "dummy" end of guard 12 having linkage arm 19 (FIG. 4) can be pivotally secured to the central-most wall of the opposing wheel well. As noted above, the battery 16 of vehicle 10 can serve as the source of electrical power, or the invention can include its own separate energy source.

Control receiving unit 22 maybe located under the hood of the car as shown in FIG. 3, or unit 22 maybe located under the dashboard of the vehicle with the electrical connectors inserted through existing holes provided in the firewall of the vehicle. When receiving unit 22 is arranged under the dashboard, it can in some instances pick up the activation signals from transmitter 20 without the need for an external antenna.

Figure 11:
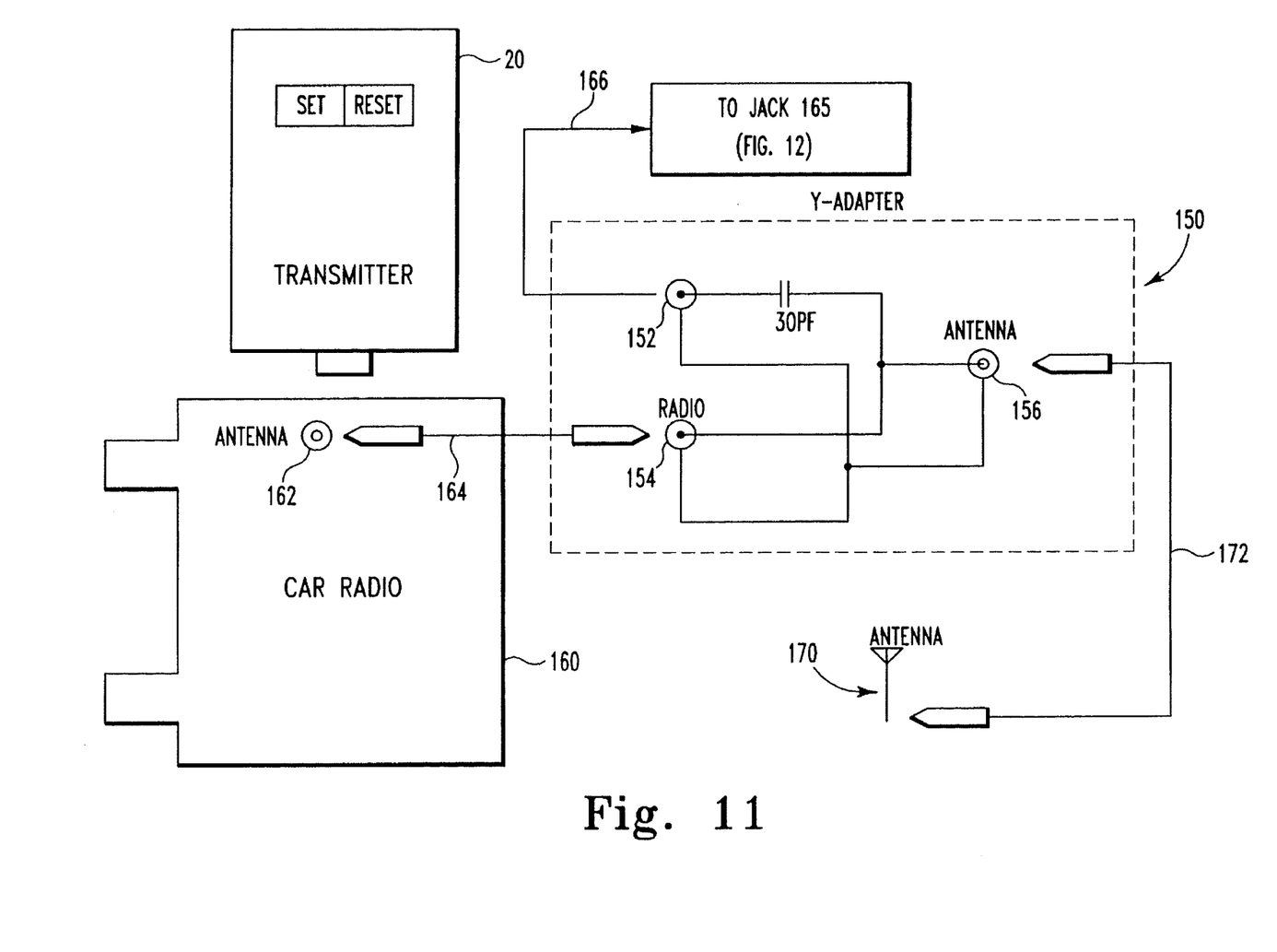
FIGS. 11–14 are schematic diagrams of the electrical circuitry of the protective assembly of the invention.
Figure 12:
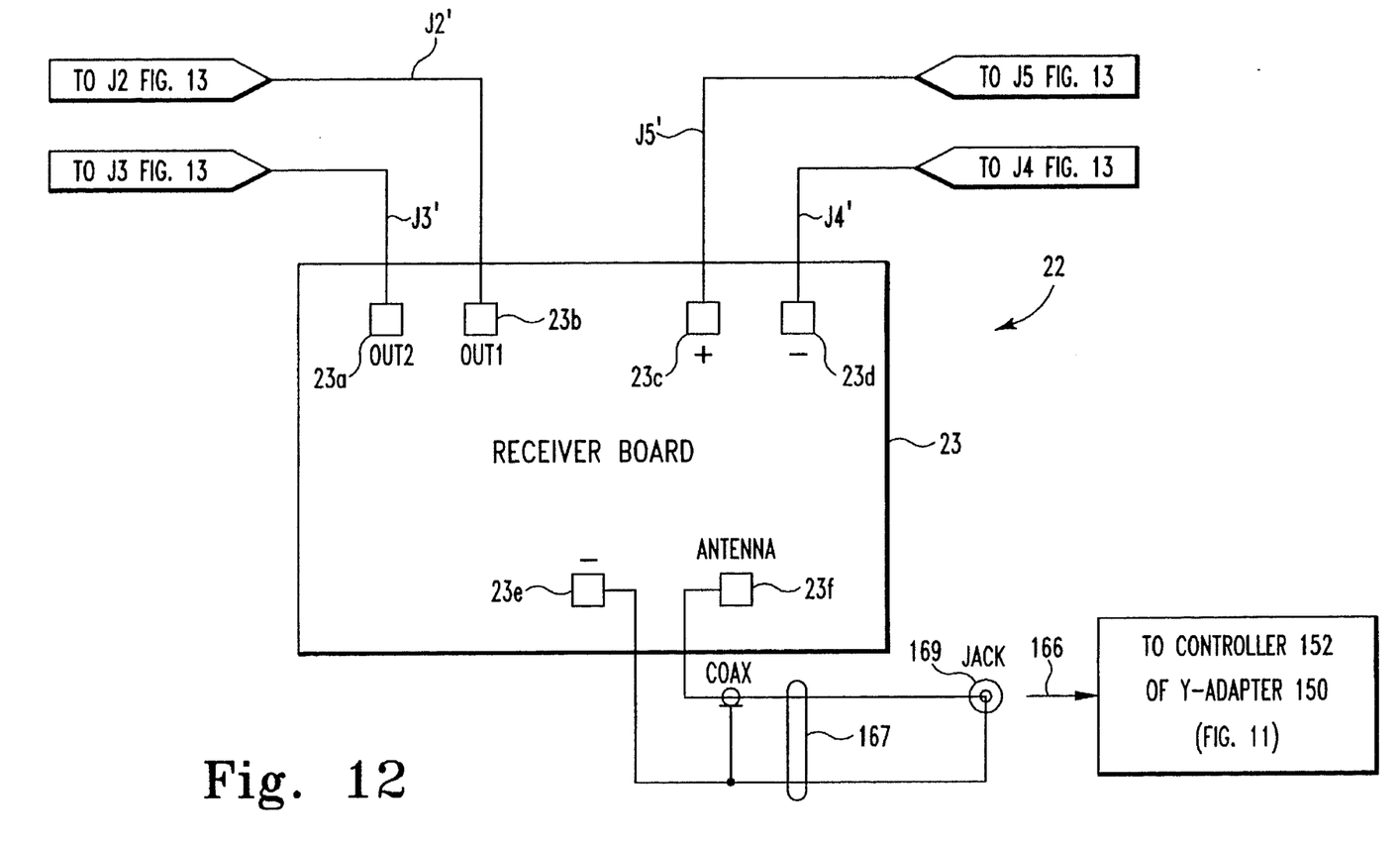
Figure 13:
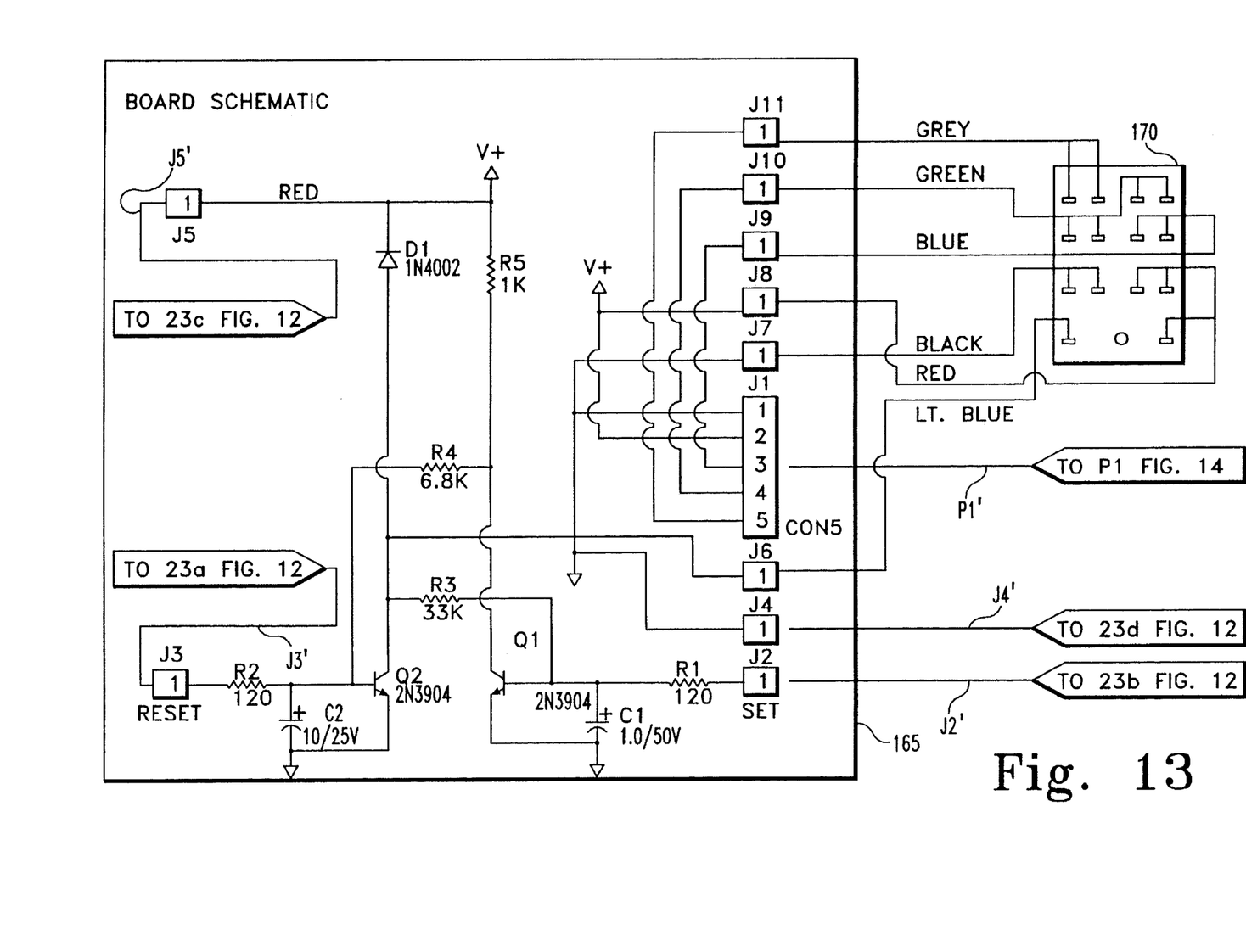

Referring now to FIGS. 11–14 wherein the electrical circuitry of the assembly of this invention is shown and controller or signal receiving unit 22 includes an internal receiver board 23 (FIG. 12), a flip-flop or trigger circuit 165 (FIG. 13) and a latching relay 170 (FIG. 13). Latching relay 170 changes the polarity of the armature 15 of motor 14, thereby making the motor reversible or bi-directional. Latching relay 170 holds the state of the relay in a latched position until it is re-energized, at which time relay 170 changes state. Flip-flop circuit 165 has two states and is able to change from one state to the other upon the application of an external stimulus, i.e., the activation/deactivation signal received from receiver board 23. The flip-flop circuit 165 receives a set signal ("Out 1" of receiver board 23) or a reset signal ("Out 2"), which is only a pulse momentary signal, and energizes the relay 170 to in turn energize motor 14 to move the guard 12 between its retracted and extended positions. Flip-flop 165 will remain in that phase until it receives another output signal from receiver board 23 at either jack 2 (J2) or jack 3 (J3) (FIG. 13 ).

The system can also include a Y-adapter 150 shown in FIG. 11 to couple the control unit 22 to the radio receiver 160 of the vehicle which, among other things, enhances the transmission and reception of the activation signals of the system by utilizing an external vehicle antenna 170 of the vehicle (FIG. 11). Antenna 170 is coupled to the antenna jack 166 of Y-adapter 150 via connector 172. Y-adapter 150 is connected at radio jack 154 to the antenna jack 162 of radio receiver 160.

Receiver board 23 of control receiving unit 22 is connected at receiver jack 169 to the controller jack 152 of Y-adapter 150 via connector 166. Jack 169 is integrally connected to receiver board 23 at headers 23e and 23f via coaxial cable 167. As shown in FIG. 12, receiver board 23 is connected to a daisy chain jumper J2 at header 23a via connector J2', connected to a second daisy chain jumper J3 at header 23b via connector J3', connected to a third daisy chain jumper J4 at header 23c via connector J4' and connected to a fourth daisy chain jumper J5 at header 23d via connector J5'.

Figure 14:
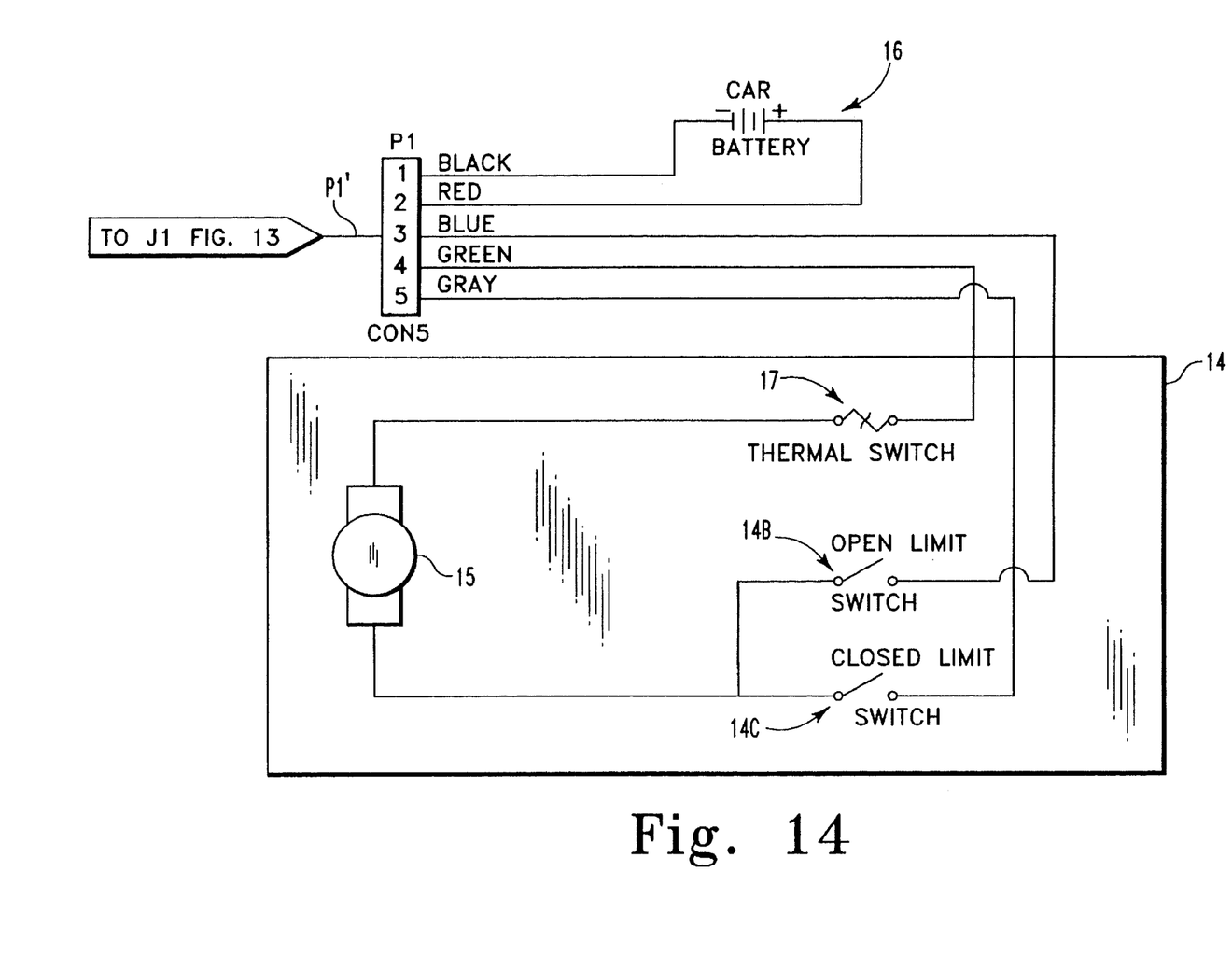

FIG. 13 more particularly presents a schematic of the flip-flop circuit 165 utilized by this invention coupled to the receiver board 23 via J2' J3' J4' and J5', and coupled to the motor circuitry of FIG. 14 via P1' at terminal block P1. As shown in FIG. 14, the circuitry of motor 14 is coupled to a power source such as battery 16 of the vehicle. As noted above, motor 14 includes internal limit switches 14B, 14C to activate and deactivate the armature 15. A thermal switch 17 is also included in the internal circuit of the motor as an over-current protective device with a thermal delay to prevent overheating and resultant damage to the system. Thermal switch 17 is "self healing" in that it will automatically reset itself once the circuit cools to an acceptable level.

Presented below in Chart One is a preferred component list for the constructing of the electrical circuitry of the system of the invention.

CHART ONE

| REFERENCE | COMPONENT | MANUFACTURER | PART NO. |
| --- | --- | --- | --- |
| Q1, Q2 | Transistor | Motorola | 2N3904 |
| D1 | Diode | Motorola | IN4002 |
| C1 | Capacitor (Tantalum, Radial) | NIC | NDTM105K50B |
| C2 | Capacitor (Tantalum, Radial) | NIC | NDTM106K25B |
| R1, R2 | Resistor (¼ W, 5% Carbon Film) | NIC | NCF25120B |
| R3 | Resistor (¼ W, 5% Carbon Film) | NIC | NCF2533KB |
| R4 | Resistor (¼ W, 5% Carbon Film) | NIC | NCF256800B |
| R5 | Resistor (¼ W, 5% Carbon Film) | NIC | NCF251000B |
| J1 | Header Assembly, (Right Angle, 5 Position) | AMP | 786487-5 |
| J2, J3, J4, J5 | Daisy Chain Chamber (5") | BERG | 47067-000 |

-continued

CHART ONE

| REFERENCE | COMPONENT | MANUFACTURER | PART NO. |
|---|---|---|---|
| J6–J10 | Hook-Up Wire, 18 AWG, PVC | Belden | 9918 |
| K1 | Relay, 4PDT | Guardian | 1315-4C-12D |
| 23a–23d | Headers, (.025" Square Post, 1 position) | AMP | 1026976-1 |
| 167 | Coaxial Antenna Cable (Miniature, 50 Ohm) | Belden | 8216 |
| 165 | Antenna Jack (Motorola Type) | MCM | 27-155 |
| 167 | Antenna Plug | MCM | 27-150 |
| 14 | Motor Assembly | | |
| | Right | Delco | 22038775 |
| | Left | | 22038776 |
| P1 | Terminal Block (Pluggable, 5 position) | AMP | 786478-5 |

A method of protecting the side and door panels of a vehicle is also provided by the invention and includes the steps of: providing a guard 12 and a separate linkage assemblies 18, 19 attached to each of the opposing ends of the guard 12; providing a reversible electric motor 14 having a drive shaft 14A; providing an electrical energy source (battery 16) to power the electric motor 14; providing a signal control receiving unit 22 carried by the vehicle and electrically coupled to the motor 14; providing a wireless portable signal transmitting unit 20 adapted to be carried by an operator; securing the motor 14 to a central-most wall of either the front or rear wheel well 10A, 10B on one side of the vehicle 10; fixedly securing one end of the guard 12 via the driving linkage assembly 18 to the drive shaft 14A of the motor 14; securing the opposing end of the guard 12 via the other (dummy) linkage assembly 19 to the central-most wall of the opposing wheel well on that same side of the vehicle so that said end of the guard pivots freely; and moving the guard 12 between its retracted position beneath the side of the bottom of the vehicle and its operative extended position adjacent to but spaced outwardly from the side of the vehicle 10 upon the activation of signal transmitting unit 120.

Although the system and method provided by the present invention have been described with a preferred embodiment, those skilled in the art will understand that modifications and variations may be made without departing from the scope of this invention as set forth in the following claims. Such modifications and variations are considered to be within the purview and scope of the appended claims.

I claim:

1. Means for protecting the vertical surfaces of a subject wheeled vehicle from the side edge of a door of an adjacent vehicle, each said vertical surface having an upper edge and a lower edge, said vehicle including a body having an underside, and at least a pair of wheel wells with liners on one side of the vehicle, said vehicle protecting means comprising:

a guard member rotatable between a first inoperative retracted position and a second operative extended position, said first inoperative retracted position being disposed beneath the underside of the vehicle, said second operative extended position being disposed adjacent to but spaced outwardly from said vertical surface of the body of the vehicle between the upper and lower edges thereof, said rotatable guard member engaging and preventing the edge of the door of the adjacent vehicle from contacting the vertical surface of the body of the subject vehicle;

a pair of linkage assemblies for pivotally securing the opposing ends of said rotatable guard member within the pair of wheel wells on one side of the vehicle to allow the rotational movement of said guard member;

a reversible electric motor for rotatingly driving said rotatable guard member back and forth between its first and second positions, said electric motor being enclosed behind the liner within one of said pair of wheel wells;

a power source for providing electrical energy to said motor; and control means for remotely activating said motor.

2. The vehicle protecting means of claim 1 wherein said motor includes a drive shaft having an end accessible within said wheel well, and wherein a first linkage assembly of said pair of linkage assemblies is fixedly secured to said drive shaft, said motor being capable upon initial activation by said remote control means of driving the drive shaft in a first rotational direction and, upon subsequent activation by said remote control means, of driving the drive shaft reversibly in an opposite second rotational direction, said rotatable guard member being movable from said first position to said second position upon said motor driving the drive shaft in said first rotational direction, and from said second position back to said first position upon said motor reversibly driving the drive shaft in the second opposite rotational direction.

3. The vehicle protecting means of claim 1 wherein said remote control means includes a radio frequency signal receiver and a portable wireless radio frequency signal transmitter, said signal receiver being electrically coupled to said motor.

4. The vehicle protecting means of claim 1 wherein the vehicle includes on at least one side thereof at least one front wheel well and at least one rear wheel well, and wherein a first linkage assembly of said pair of linkage assemblies pivotally secures one end of said rotatable guard member within the front wheel well and a second linkage assembly of said pair of linkage assemblies secures the opposing end of said rotatable guard member within the rear wheel well.

5. A protective apparatus for use in combination with a vehicle body to protect the side and door panels of the vehicle body wherein the vehicle body has at least a pair of wheel wells on at least one side thereof, each of said at least pair of wheel wells being equipped with a liner, said protective apparatus comprising:

an elongated guard movable between a retracted position in which it underlies the vehicle body and an extended position in which it overlies the side of the vehicle body in a laterally spaced relation;

a bi-directional motor having a drive shaft for moving said guard between its retracted and extended positions, said motor being disposed within one of said pair of wheel wells behind the liner thereof to be protected from the elements with the drive shaft thereof extending outwardly through the liner of said wheel well;

a pair of linkage assemblies pivotally securing said guard to the vehicle body, a first of said pair of linkage assemblies securing a first end of said guard within one wheel well of the vehicle body and a second of said pair of linkage assemblies securing a second end of said guard within the opposing wheel well of the vehicle body, said first linkage assembly being fixedly secured to the drive shaft of said motor to define an intermediary through which the motion of said drive shaft is transferred to said guard;

a power source for providing electrical energy to said motor; and control units allowing for the remote activation of said motor.

6. The protective apparatus as in claim 5 wherein the vehicle includes a battery and wherein said power source providing electrical energy to said motor is defined by said vehicle battery.

7. The protective apparatus as in claim 5 wherein said second linkage assembly is secured to the wheel well of the vehicle body to allow for its free rotation.

8. The protective apparatus as in claim 5 wherein said guard is at least partially encased in a protective covering.

9. The protective apparatus as in claim 5 wherein said motor is enclosed adjacent to a central-most wall of and behind the liner of one of said pair of wheel wells and said first linkage assembly is fixedly secured to the drive shaft of said motor, and wherein said second linkage assembly is freely, rotatably secured to a central-most wall of the opposing wheel well of the vehicle body.

10. The protective apparatus as in claim 5 wherein said motor, upon being activated by said control units, drives the drive shaft in a first rotational direction which moves said guard via the intermediary first linkage assembly from its retracted position to its extended position, and wherein said motor, upon being subsequently activated by said control units, reversibly drives the drive shaft in a second opposite rotational direction which moves said guard via the intermediary first linkage assembly from its extended position back to its retracted position.

11. The protective apparatus as in claim 5 wherein said control units are wireless and include a signal receiver and a portable signal transmitter, said signal transmitter being carried and operable by an operator, said receiver being coupled to said motor and, upon receiving an activation signal from said portable signal transmitter, activating said motor to move said guard between its retracted and extended positions.

12. The protective apparatus as in claim 5 wherein said control units include a latching relay and a trigger circuit to energize said motor, said trigger circuit, upon receiving a signal, energizing said latching relay to in turn energize and change the polarity of said motor, thereby rendering said motor bi-directional.

13. The protective apparatus as in claim 5 wherein said guard comprises a straight rod member secured at each end by said pair of linkage assemblies.

14. A protective assembly kit on a vehicle for protecting the side and door panels of the vehicle wherein the vehicle includes a battery and a body, the vehicle body having a pair of wheel wells with liners on at least one side thereof, said protective assembly kit comprising:

a bi-directional electric motor having a drive shaft, said motor being enclosed from the elements behind the wheel well liner and adjacent to a central-most wall of one of said pair of wheel wells and electrically coupled to the battery of the vehicle, said drive shaft extending through the liner adjacent the central-most wall of said wheel well such that the end of said drive shaft is accessible within the wheel well;

an elongated bumper bar having opposing ends;

a driving arm assembly having a first end and a second end, said first end being fixedly connected to the drive shaft of said motor extending through the liner adjacent the central-most wall of said wheel well, and said second end being fixedly connected to a first end of said bumper bar;

a dummy pivot arm assembly having a first end and a second end, said fist end being freely pivotally secured to the central-most wall of the opposite wheel well and said second end being fixedly connected to the opposing second end of said bumper bar;

a signal receiver carried by the vehicle and electrically coupled to said motor and vehicle battery; and a wireless signal transmitter carried by an operator,
said wireless signal transmitter being operable to generate a radio frequency signal detectable by said signal receiver for activating said motor, which in turn rotatingly drives said drive shaft, said drive shaft pivotally moving said driving arm assembly, which in turn correspondingly carries said bumper bar along therewith in a rotating fashion between a retracted position beneath the side of the vehicle body and an extended position overlying the side and door panels of the body of the vehicle and disposed between the wheel wells thereof, said bumper bar being spaced vertically upwardly from a bottom edge of the body of the vehicle while in its extended protective position, said signal receiver, upon detecting a subsequent radio frequency signal generated by said signal transmitter, activating said motor to move the bumper bar in the reverse direction back to its retracted position.

15. A method of protecting the side and door panels of a vehicle, said vehicle having a pair of wheel wells with liners on at least one side thereof, said method comprising the steps of:

providing a bumper guard having first and second linkage arms attached to the opposing ends of said guard;

providing a reversible electric motor having a drive shaft;

providing an electrical energy source to power said electric motor;

providing a signal receiving unit carried by said vehicle and electrically coupling said signal receiving unit to said motor;

providing a portable remote signal transmitting unit carried and operable by an operator;

enclosing the motor adjacent to a central-most wall of one of the wheel wells of the vehicle such that the drive shaft of said motor extends outwardly through the liner adjacent the central-most wall of said wheel well;

fixedly securing one end of the bumper guard via said first linkage arm to the drive shaft of said motor;

securing the opposing end of said bumper guard via said second linkage arm to the central-most wall of the opposing wheel well so that the opposing end of said bumper guard pivots freely;

moving the bumper guard between an inoperative retracted position beneath the vehicle and an operative extended position adjacent to but spaced outwardly from the side of the vehicle for engaging objects with said bumper guard and preventing said objects from contacting the side and door panels of the vehicle, said step of moving the bumper guard including the steps of:

activating said portable signal transmitting unit and generating an activation signal;

receiving said activation signal with said receiving unit;

activating said motor with said signal receiving unit upon receiving said activation signal; and moving said bumper guard via the drive shaft and said first linkage arm in a first direction from its inoperative retracted position to its operative extended position and, upon receiving a next signal, activating said electric motor to move said bumper guard in a second opposite direction from its operative extended position back to its inoperative retracted position.

* * * * *